(No Model.)
J. E. HAYWARD.
WEARING PAD FOR HORSES.
No. 460,822. Patented Oct. 6, 1891.
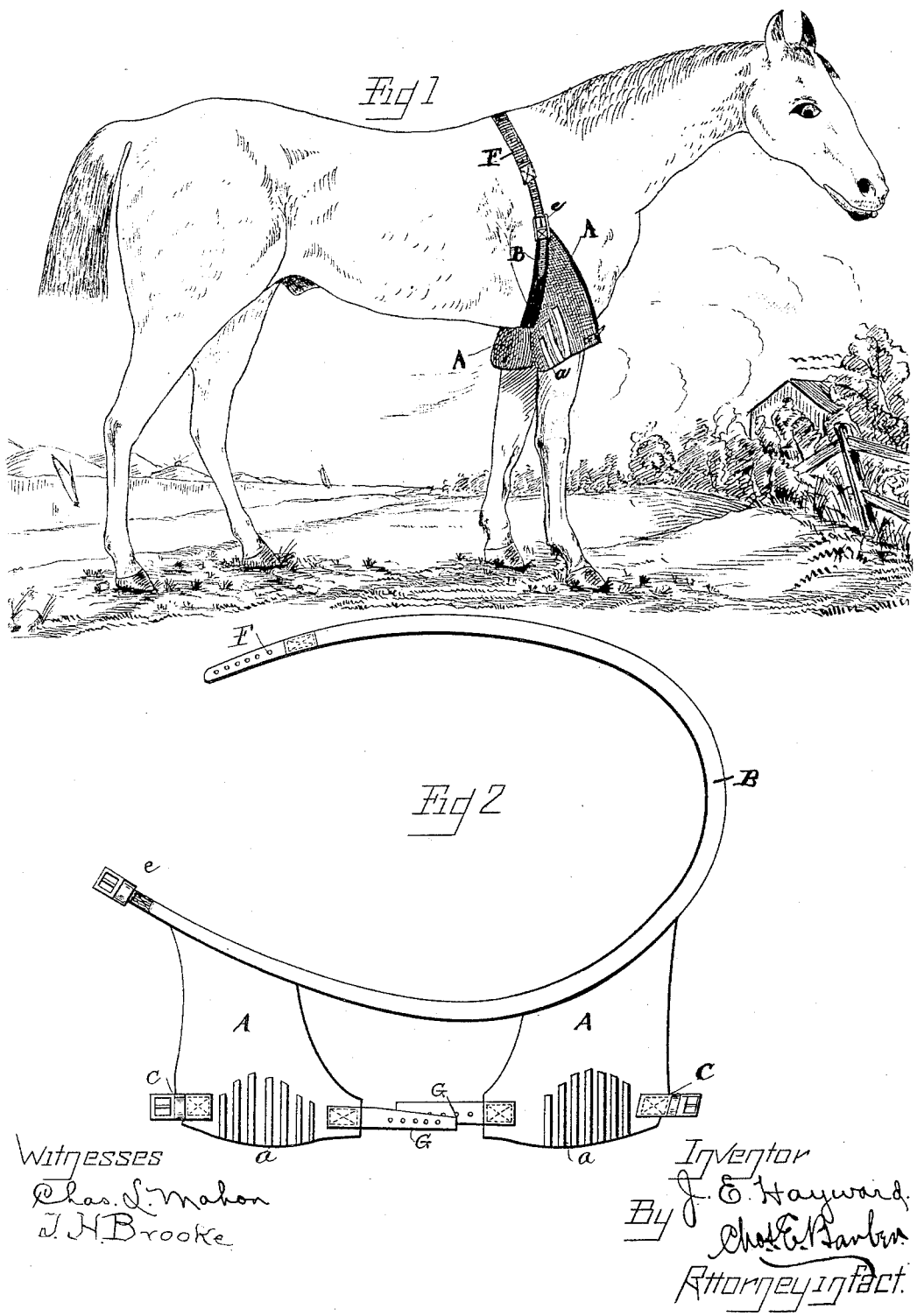

UNITED STATES PATENT OFFICE.

JOSIAH E. HAYWARD, OF ELMWOOD, MASSACHUSETTS.

WEARING-PAD FOR HORSES.

SPECIFICATION forming part of Letters Patent No. 460,822, dated October 6, 1891.

Application filed April 15, 1889. Serial No. 307,386. (No model.)

*To all whom it may concern:*

Be it known that I, JOSIAH E. HAYWARD, a citizen of the United States, residing at Elmwood, in the county of Plymouth and State of Massachusetts, have invented a new and useful Improvement in Wearing-Pads for Horses, of which the following is a specification.

The object of my invention is to provide a suitable protection for the two front legs of a horse at the shoulder to prevent shoe-boil poison, caused by the sharp points of the shoes resting on the shoulder when the animal is lying down, as the front legs are curled up, with the whole weight of the body resting on them.

My invention consists of two wearing-pads composed of canvas with felt stuffing and strips of leather sewed on the outside, making it strong and durable and provided with a suitable strap and buckle for fastening around the legs, and each are supported and held in position by a strap of leather or webbing, which is buckled around the body, making it impossible for the pad to get out of place.

Reference being had to the accompanying drawings, Figure 1 represents a side view of a horse with the wearing-pad in position. Fig. 2 is a detail view of the wearing-pad.
Similar letters refer to similar parts throughout the several views.

My improvement is composed of the canvas piece A, of a suitable shape to properly fit the leg, having a felt stuffing at *a a*, this point being cup-shaped to fit closely to the joint of the shoulder when the animal is lying down and being well protected by the leather strips sewed on at *a a*, the strap G, and buckle C for fastening the pad to the leg, as shown in Fig. 2. Two of the pads A are used, one for each front leg of the animal, fastened together or supported by a strap of leather or webbing of such length as to pass entirely around the body, back of the front legs, and adjusted by the strap and buckle F *c*.

It will be seen that when the animal is standing, as in Fig. 1, this wearing-pad hangs loosely around the legs, giving free movement to them; but when lying down it fits closely to the joint, owing to the peculiar shape of the pad A. (Shown in Fig. 2.)

It is understood that this pad is to prevent, protect, and cure horses from having shoe-boil poison, which is caused by the corks and sharp edges of the shoes being brought in contact with the shoulders of the front legs when lying down, and not intended to be used as an interfering-pad when the animal is in harness.

I am aware that prior to my invention wearing-pads have been made for horses. I therefore do not claim this construction, aside from the supporting-strap B, as novel.

What I do claim, and desire to secure by Letters Patent, is—

A pad of the character described, comprising the two padded flaps provided with strips *a a*, the buckles C C, the straps G G, and a strap B, to which said flaps are secured, said strap adapted to encircle the horse, and a buckle *c* for said strap, substantially as described.

JOSIAH E. HAYWARD.

Witnesses:
JOSEPH TOOKER,
HOSEA KINGMAN.